US012613901B2

(12) United States Patent
Denneson et al.

(10) Patent No.: US 12,613,901 B2
(45) Date of Patent: Apr. 28, 2026

(54) SYSTEMS AND METHODS FOR GENERATING GRAPHICAL VIEWS

(71) Applicant: Thomson Reuters Enterprise Centre GmbH, Zug (CH)

(72) Inventors: Travis Jon Denneson, Rosemount, MN (US); Shelly Albaum, Sebastopol, CA (US); Ryan Douglas Kelly, Minneapolis, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

(21) Appl. No.: 18/466,812

(22) Filed: Sep. 13, 2023

(65) Prior Publication Data

US 2024/0086465 A1 Mar. 14, 2024

Related U.S. Application Data

(60) Provisional application No. 63/405,913, filed on Sep. 13, 2022.

(51) Int. Cl.

| | |
|---|---|
| *G06F 16/9038* | (2019.01) |
| *G06F 9/451* | (2018.01) |
| *G06F 16/35* | (2019.01) |
| *G06F 40/194* | (2020.01) |
| *G06F 40/279* | (2020.01) |
| *G06Q 50/18* | (2012.01) |

(52) U.S. Cl.
CPC .............. *G06F 16/35* (2019.01); *G06F 9/451* (2018.02); *G06F 16/9038* (2019.01); *G06F 40/194* (2020.01); *G06F 40/279* (2020.01); *G06Q 50/18* (2013.01)

(58) Field of Classification Search
CPC ................................................... G06F 16/9038
USPC ......................................................... 707/722
See application file for complete search history.

(56) References Cited

U.S. PATENT DOCUMENTS

| | | |
|---|---|---|
| 2006/0041607 A1 | 2/2006 | Miller et al. |
| 2007/0130100 A1 | 6/2007 | Miller |

(Continued)

OTHER PUBLICATIONS

Patent Cooperation Treaty, International Search Report and Written Opinion issued for PCT Application No. PCT/US2023/074124, dated Dec. 13, 2023, 8 pages.

*Primary Examiner* — Kimberly L Wilson
(74) *Attorney, Agent, or Firm* — Norton Rose Fulbright US LLP

(57) ABSTRACT

Systems and methods are disclosed for generating graphical views of searches. For example, a set of search results may be identified based on a search of legal content maintained at a data source and the search results may be output to a graphical user interface (GUI). Information associated with particular search results of the set of search results may be displayed in response to inputs corresponding to activation of interactive elements of the GUI are received, and the disclosed systems and methods may track one or more metrics associated with the interactions corresponding to each displayed search result. A graphical view of the displayed search results (i.e., ones viewed by the researcher) may be generated based on the one or more metrics and output to a display device. The tracked metrics may be used to quantify a relevancy of the search results, which may be indicated in the graphical view.

18 Claims, 6 Drawing Sheets

500

510 — Identifying, by one or more processors, a set of search results based on one or more search parameters 520 — Output, by the one or more processors, the set of search results to a graphical user interface (GUI)

530 — Receive, by the one or more processors, inputs corresponding to activation of interactive elements of the GUI 540 — Track, by one or more processors, one or more metrics associated with interactions corresponding to each search result displayed in response to the inputs 550 — Generate, by the one or more processors, a graphical view of the interactions based on the one or more metrics 560 — Output, by the one or more processor, the graphical view

(56) References Cited

U.S. PATENT DOCUMENTS

| | | | |
|---|---|---|---|
| 2009/0144264 A1* | 6/2009 | Singh | ................. G06F 16/9558 |
| | | | 707/999.005 |
| 2009/0187567 A1 | 7/2009 | Rolle | |
| 2010/0153427 A1* | 6/2010 | Schechter | ............ G06F 16/951 |
| | | | 707/E17.014 |
| 2012/0036125 A1 | 2/2012 | Al-Kofahi et al. | |
| 2016/0042054 A1 | 2/2016 | Lu et al. | |
| 2017/0364566 A1* | 12/2017 | Bullis | ................. G06F 16/2246 |
| 2021/0049193 A1* | 2/2021 | Lisa | ...................... G06F 3/0488 |

* cited by examiner

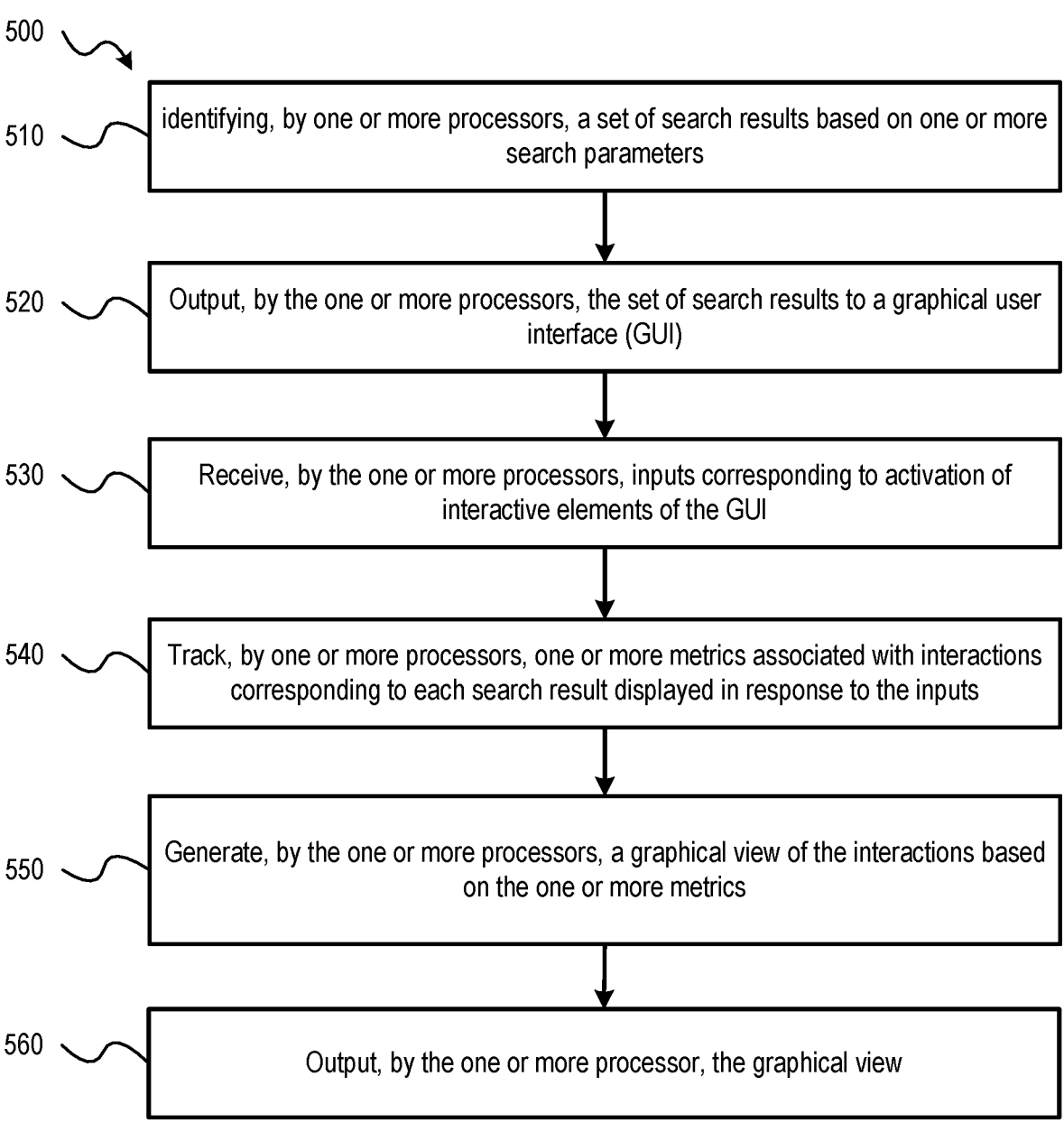

500

510 — identifying, by one or more processors, a set of search results based on one or more search parameters 520 — Output, by the one or more processors, the set of search results to a graphical user interface (GUI)

530 — Receive, by the one or more processors, inputs corresponding to activation of interactive elements of the GUI 540 — Track, by one or more processors, one or more metrics associated with interactions corresponding to each search result displayed in response to the inputs 550 — Generate, by the one or more processors, a graphical view of the interactions based on the one or more metrics 560 — Output, by the one or more processor, the graphical view

FIG. 5

SYSTEMS AND METHODS FOR GENERATING GRAPHICAL VIEWS

PRIORITY

The present application claims the benefit of and priority to U.S. Provisional Application No. 63/405,913, filed Sep. 13, 2022, and entitled "SYSTEMS AND METHODS FOR A GRAPHICAL VIEW OF SEARCH HISTORY", the content of which is incorporated herein by reference in its entirety.

TECHNICAL FIELD

The present disclosure relates to dynamic search functionality and more specifically, to systems and methods for dynamically generating graphical views of search histories.

BACKGROUND

Legal research systems and services provide functionality for performing legal research, such as to enable a researcher to search over large volumes of case law and other legal data to identify authority addressing one or more legal issues. The search results may include many different documents, some of which may rely on the content of other documents when making assertions or providing conclusions. For example, in a first legal case treating a legal issue or point of law, the legal case may rely on a decision or treatment of the issue in a second case. In this sense, the first case may cite the second case. Many other cases may also cite to the second case. When this occurs, the researcher may access and review a large volume of cases for analysis, which may involve several hours, days, or longer periods of time.

If the researcher takes a break from reviewing the search results and/or refining the search it may be difficult for the researcher to pick back up where the researcher left off or returning to a relevant line of searching after analyzing a series of cases that turned out to be unhelpful to the research. To illustrate, if the researcher hits a dead end after going down a rabbit hole reviewing a set of search results or a line or searching, it may be difficult for the researcher to get back to the point in the previous search process prior to going down the rabbit hole. While currently available citation systems provide functionality to search large volumes of data and to present conventional search histories (e.g., as a long list of events in chronological order), such citation systems lack tools for intelligently managing searches and providing insights into and indications of relevance for searches performed using those systems.

SUMMARY

Embodiments of the present disclosure provide systems, methods, and computer-readable storage media supporting functionality for dynamic generation of graphical representations of search histories. The disclosed systems and methods track a variety of metrics and actions associated with performed searches and utilize the metrics and actions to generate graphical representations of search histories for presentation in a graphical user interface (GUI). The graphical representations of searches displayed in the GUI may be updated on-demand (e.g., upon request) or in real time or near real time (e.g., as a search is performed and the results are reviewed). The graphical representations may display information representative of a search that has been performed, search results reviewed, and additional information related to review of the search results, such as information identifying additional documents or information that, while not directly returned as part of the search results, may have been encountered while interacting with the search results. The graphical view may use one or more types of visual indicators to indicate a relevancy of one or more reviewed search results, which may signify to a researcher which portions of the search and/or search results were more relevant to the issue(s) being researched, thereby not only providing the researcher with information on the state of the research being performed, but also quantifying which portions of the research appear to be most relevant to the research being performed, which is are capabilities that are lacking in prior search platforms. Such information may provide the additional benefit of enabling the researcher to return to a line of searching and/or reviewing the search results after a break or when a line of searching results in a dead end or other undesirable result, thereby improving the overall efficiency at which the research is performed.

In one configuration, a method is provided. The method includes identifying, by one or more processors, a set of search results based on one or more search parameters. The set of search results may correspond to legal content maintained at a data source. The method also includes outputting, by one or more processors, the set of search results to a graphical user interface (GUI). The method also includes receiving, by one or more processors, inputs corresponding to activation of interactive elements of the GUI. The information may be associated with a particular search result of the set of search results and may be displayed in response to the inputs. The method also includes tracking, by one or more processors, one or more metrics associated with interactions corresponding to each search result displayed in response to the inputs. The method also includes generating, by one or more processors, a graphical view of the interactions based on the one or more metrics. The graphical view may display information associated with each particular search result displayed in response to the activation of the interactive elements. The method also includes outputting, by one or more processors, the graphical view to a display device.

In one configuration, a system is provided. The system includes a memory and one or more processors communicatively coupled to the memory. The one or more processors may be configured to identify a set of search results based on one or more search parameters. The set of search results correspond to legal content maintained at a data source. The processors may be configured to output the set of search results to a graphical user interface (GUI). The processors may also be configured to receive inputs corresponding to activation of interactive elements of the GUI. Information associated with a particular search result of the set of search results may be displayed in response to the inputs. The system may be configured to track one or more metrics associated with interactions corresponding to each search result displayed in response to the inputs. The system may also be configured to generate a graphical view of the interactions based on the one or more metrics. The graphical view may display information associated with each particular search result displayed in response to the activation of the interactive elements and the system may be configured to output the graphical view to a display device.

In one configuration, a non-transitory computer-readable storage medium is provided for storing instructions that, when executed by one or more processors, cause the one or more processors to perform operations that include: identifying a set of search results based on one or more search parameters. The set of search results correspond to legal content maintained at a data source. The operations may also include outputting the set of search results to a graphical user interface (GUI); and receiving inputs corresponding to activation of interactive elements of the GUI. Information associated with a particular search result of the set of search results may be displayed in response to the inputs. The operations may also include tracking one or more metrics associated with interactions corresponding to each search result displayed in response to the inputs; and generating a graphical view of the interactions based on the one or more metrics. The graphical view may display information associated with each particular search result displayed in response to the activation of the interactive elements; and the operations may include outputting the graphical view.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF DRAWINGS

For a more complete understanding of the present disclosure, reference is now made to the following descriptions taken in conjunction with the accompanying drawings, in which:

FIG. 5 is a flow diagram of an exemplary method for detecting anomalies in accordance with aspects of the present disclosure is shown.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Figure 1:
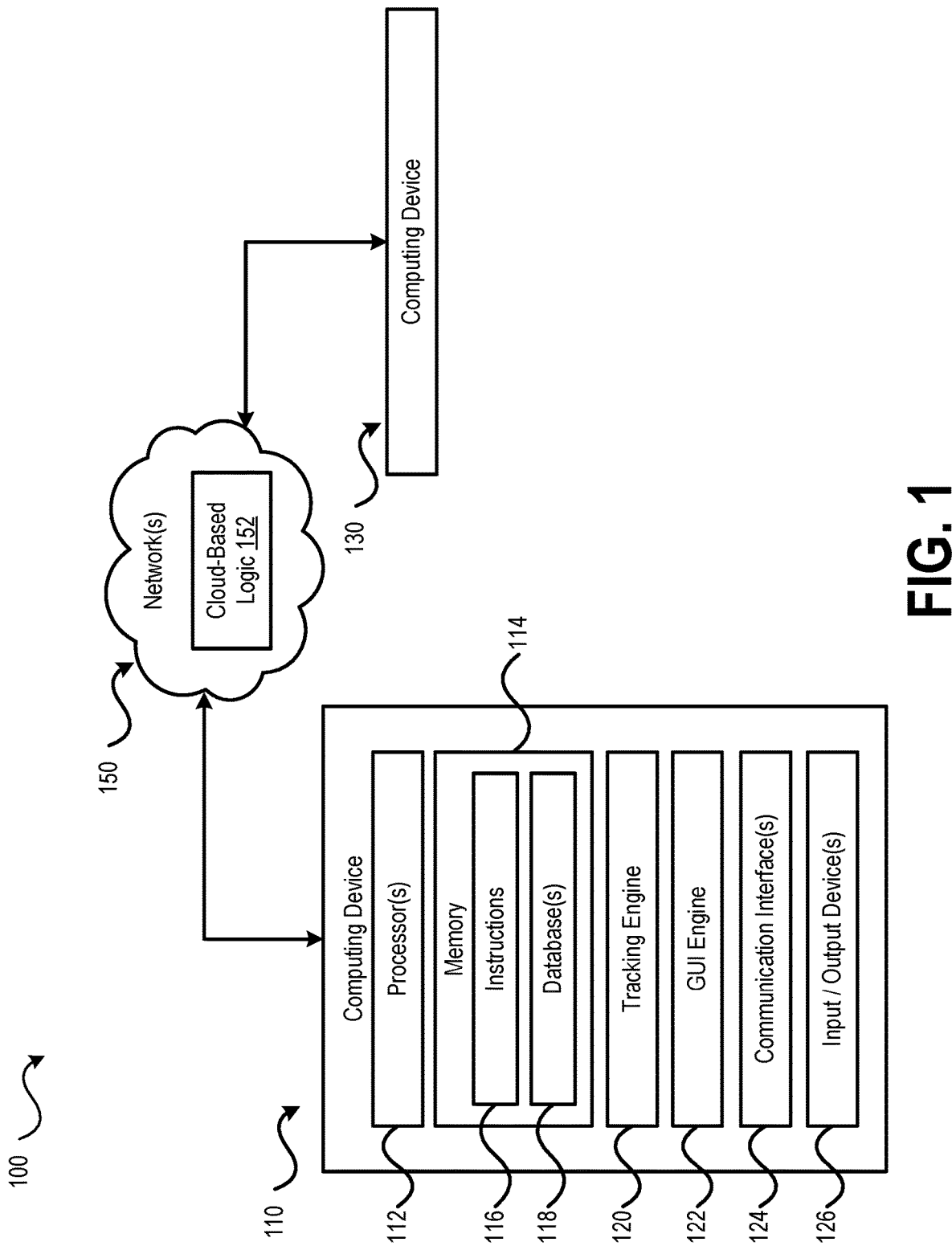
FIG. 1 shows a block diagram of a research system in accordance with aspects of the present disclosure.

Referring to FIG. 1, a block diagram of a research system in accordance with aspects of the present disclosure is shown as a system 100. As described in more detail below, the system 100 is configured to provide functionality that supports generation of graphical representations of searches. The system 100 provides functionality to track various metrics associated with actions performed with respect to a search being conducted by a researcher and the graphical representations or graphical views may be generated based on the tracked metrics. The tracked metrics may also be used by the system 100 to quantify which portions of the search appear to be most relevant to the researcher conducting the search, which may aid the researcher in advancing the research after taking a break from the search, after determining a dead end has been reached with respect to a particular part of the search, or some other issue during the research. Additional exemplary details and operations regarding the functionality of the system 100 are described in more detail below.

As illustrated in FIG. 1, the system 100 includes a computing device 110 that includes one or more processors 112, a memory 114, a tracking engine 120, a GUI engine 122, one or more communication interfaces 124, and input/output (I/O) devices 126. The one or more processors 112 include a central processing unit (CPU), graphics processing unit (GPU), a microprocessor, a controller, a microcontroller, a plurality of microprocessors, an application-specific integrated circuit (ASIC), an application-specific standard product (ASSP), or any combination thereof. The memory 114 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. The memory 114 may also store instructions 116 that, when executed by the one or more processors 112, cause the one or more processors 112 to perform operations described herein with respect to the functionality of the computing device 110 and the system 100. The one or more database 118 may be configured to store one or more datasets that may be utilized to generate graphical views in accordance with aspects of the present disclosure, as described in more detail below.

The communication interface(s) 124 may be configured to communicatively couple the computing device 110 to one or more networks 150 via wired or wireless communication links according to one or more communication protocols or standards. The I/O devices 126 may include one or more display devices, a keyboard, a stylus, one or more touchscreens, a mouse, a trackpad, a camera, one or more speakers, haptic feedback devices, or other types of devices that enable a user to receive information from or provide information to the computing device 110.

The tracking engine 120 may be configured to track metrics associated with searches performed in accordance with aspects of the present disclosure. For example, the tracked metrics may include anchor points, timestamps, interactions, or other observable interactions with the search and/or search results. The anchor points may correspond to searches performed. For example, each time that a query is submitted to initiate a search a new anchor point may be identified. The interactions may correspond to interactions with respect to viewing search results and content identified as a byproduct of the search. For example, the search may return a set of search results that includes case law documents, legal statutes, journal articles, or other types of documents discussing one or more points of law of interest as defined by the query submitted by the researcher. Within the search results additional information may be provided, such a headnote, a Key Cite, or other information related to a search result being viewed. In an aspect, such additional sources of information may not be returned directly as search results and may instead correspond to additional or related content that may be linked to a search result being viewed (e.g., a case law document may include an interactive link to a Key Cite or journal article). The timestamps may indicate when a user initiated a particular action, such as running the search, interacting with search results (e.g., when the user started and/or stopped viewing the search result or related content). In an aspect, the tracked metrics may also include derived metrics that are obtained based on one or more of the above-described metrics. For example, the amount of time spent viewing a particular search result or related content may be calculated based on the timestamps corresponding to the start/stop times when the user was viewing content.

The GUI engine 122 may be configured to generate graphical views of the search being performed (or a past search that was performed) based on the above-described metrics. For example, the GUI engine 122 may utilize the anchor points to define individual graphical views, and the tracked interactions with the search results of a particular anchor point may be used to fill out the graphical view. In an aspect, the graphical view may be similar to a tree structure, where the anchor point serves as a root of the tree and each interaction is a leaf or intermediary node of the tree, as described in more detail below with reference to FIGS. 2A-2C.

In an aspect, the GUI engine 122 may generate the graphical views of a particular search on demand. For example, a GUI used to provide a search interface supporting submission of queries and to present search results may include an interactive element (e.g., a button or icon) that, when activated, generates the graphical view of the search up to the point in time the interactive element was activated. In an additional or alternative aspect, the graphical view may be generated and presented in real time or near real time (e.g., as the search is performed, and new interactions occur). It is noted that presenting the graphical view of a search on demand may be particularly useful when the user may desire to see graphical views of historic searches or when a period of time has elapsed since the user last interacted with a search (e.g., took a break for an hour or started the research on one day and was continuing the research the following day). Additionally, presentation of the graphical view in real time or near real time may be particularly beneficial when a user is actively performing a search (e.g., because the graphical view provides a real time view of the scope of the search that has been performed and may provide insights into a direction where the research should go in the future). In an aspect, the GUI may present the graphical view within a particular tab of the search interface (e.g., a graphical view tab). In an additional or alternative aspect, the graphical view may be presented in a pop-up window. In still another additional or alternative aspect, the graphical view may be presented within a region of the search interface. Other implementations are also possible. In an aspect, the methodology used to present the graphical view within the GUI may be configurable, such as based on one or more viewing preferences that may be configured by the researcher.

Figures 2A, 2B, 2C:
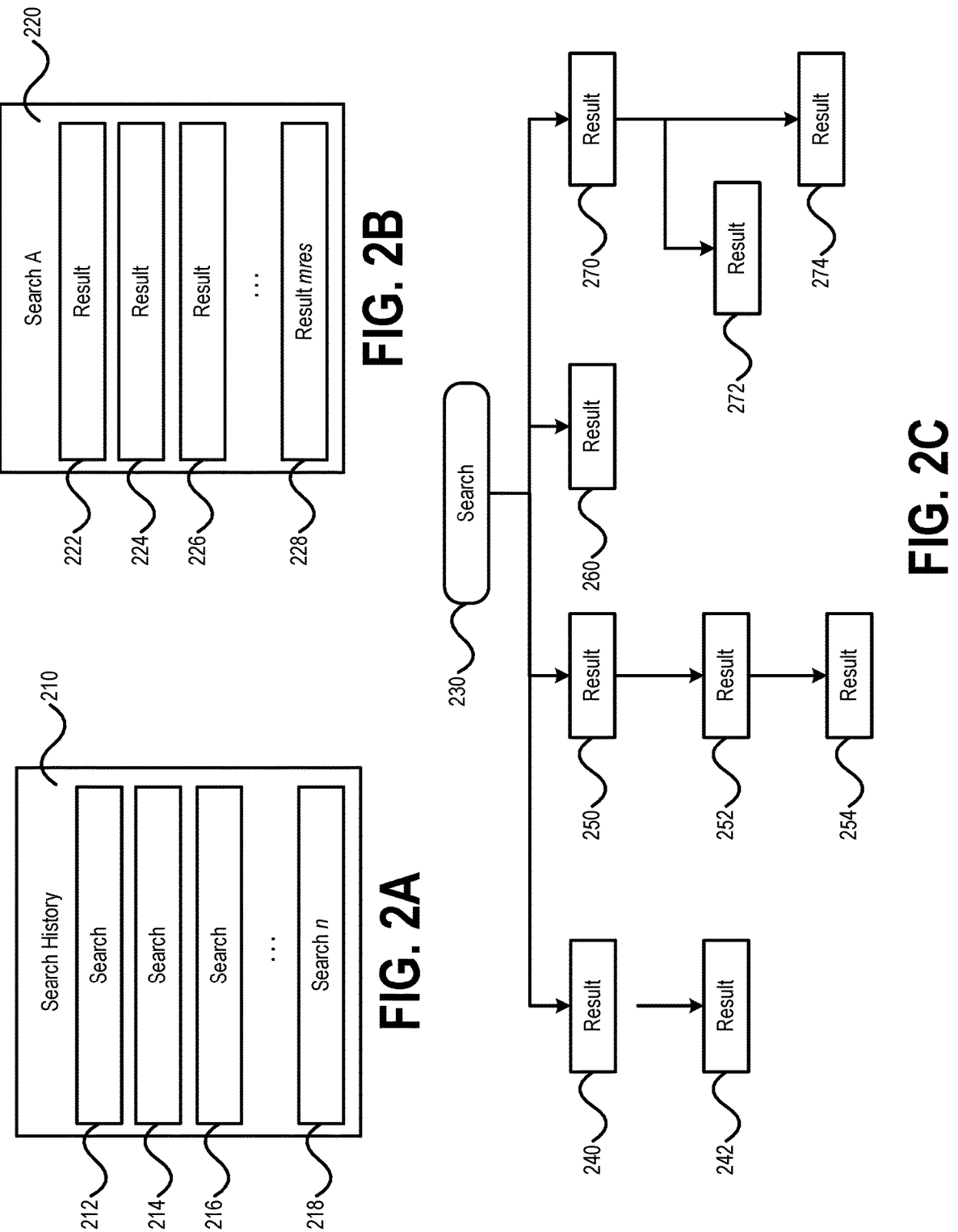
FIGS. 2A-2C are block diagram illustrating exemplary aspects of GUIs generated in accordance with aspects of the present disclosure.

To illustrate the above-described concepts, an illustrative example will now be described with reference to FIGS. 2A-2C, which are block diagram illustrating exemplary aspects of GUIs generated in accordance with aspects of the present disclosure. In FIG. 2A, a GUI displaying a search history is shown as a GUI 210. As briefly explained above, each anchor point may correspond to a different search performed by a researcher. In the example of FIG. 2A, the GUI 210 shows n searches 212, 214, 216, 218, each of which may correspond to an anchor point for a graphical view. It is noted that each of the n searches may be associated with a different set of search parameters (e.g., a different search query), but there may be some overlap between the search parameters of different ones of the n searches. For example, a researcher may perform the search 214 with a first set of search parameters and may modify the search parameters after reviewing at least some of the search results corresponding to the search 214 (e.g., because many reviewed search results were irrelevant, too focused on a particular point of interest for the search while lacking on another point of interest, or some other reason). In such instance the search 212 may be associated with a set of search parameters that at least partially overlap (e.g., include common search terms) the search parameters of the search 214.

Each of the searches of FIG. 2A may be associated with a set of search results, which may be presented in a search results interface, shown in FIG. 2B as a GUI 220. The GUI 220 includes a set of m search results 222, 224, 226, 228, which may correspond to the search results obtained for one of the n searches of FIG. 2A. As briefly explained above, a user may select or otherwise interact with one or more of the search results 222, 224, 226, 228, such as to view the search results and evaluate whether the viewed search results provide useful information in connection with the research being performed. As noted above, some of the search results may include links or otherwise reference additional content that was not explicitly identified by the search. For example, a case law document may include a link to view a Key Cite or another case cited within the case law document being viewed. Although such sources of information may have been obtained as a result of the search, those sources may not be identified in the search results shown in the GUI 220 since the sources were linked from a search result rather than the GUI 220. Nevertheless, the tracking engine 120 of FIG. 1 may capture information indicating the interaction with such alternative sources of information and associate that interaction with the anchor point corresponding to the search associated with the search results presented in the GUI 220.

To illustrate and referring to FIG. 2C, a block diagram illustrating a graphical view of a search generated in accordance with aspects of the present disclosure is shown. The graphical view of FIG. 2C includes an anchor point 230, which may correspond to one of the searches shown in the GUI 210 of FIG. 2A. The graphical view of FIG. 2C includes several levels, with a first level corresponding to results 240, 250, 260, 270, a second level corresponding to results 242, 252, 272, 274, and a third level corresponding to result 254. As can be appreciated from FIG. 2C, the exemplary graphical view indicates the researcher performed a search corresponding to the anchor point 230 (e.g., a search for "is an email sent from your work computer to your personal attorney protected by attorney-client privilege?"). The first layer may identify a set of search results that were returned in response to the search and that the researcher viewed. That is, the search results may include more search results other than the results 240, 250, 260, 270 which are not shown in the graphical view because the research did not interact with those other results (e.g., based on the tracking performed by the tracking engine 120 of FIG. 1). The second layer (e.g., results 242, 2525, 272, 274) and third layer (e.g., result 254) may correspond to sources of information derived from the results of the first layer, rather than results returned in response to the search. For example, result 242 may correspond to a Key Cite identified in the result 240, result 252 may correspond to a Key Cite identified in the result 250 and the result 254 may be another case law document or journal article cited by the result 252 (e.g., the Key Cite). As another example, the result 272 may correspond to a Key Number System query initiated while viewing the result 270, and the result 274 may correspond to another source of information identified within the result 270. As can be appreciated from the foregoing, the tracking metrics provided by the tracking engine 120 of FIG. 1 enable tracking of not only the queries or searches that a researcher performs, but also the researcher's interactions with the search results obtained from that search, including additional content not included in the results themselves (e.g., the second and third layers shown in the graphical view). Furthermore, the tracked metrics enable generation of a graphical view of research that provides insights into the research conducted at a particular point in time (e.g., the time at which the graphical view is generated). It is noted that the graphical view may be configured to present additional types of information associated with the research being conducted. For example, the graphical view may be configured to display graphical icons or elements that indicate filters applied to the search results. In an aspect, the graphical view may include an icon to view search results that have not been interacted with in addition to displaying the above-described elements corresponding to search results and derived content that the researcher has interacted with.

Figure 3A:
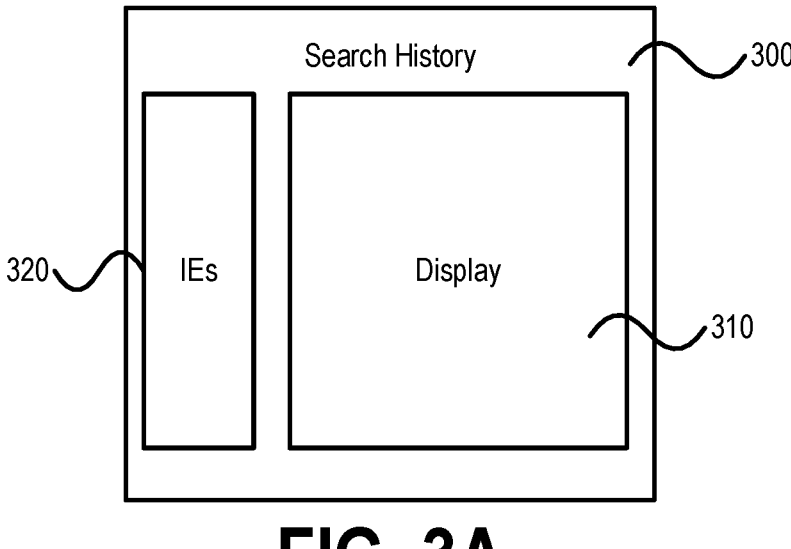
FIGS. 3A-3B are additional block diagrams illustrating exemplary aspects of GUIs generated in accordance with aspects of the present disclosure.
Figure 3B:
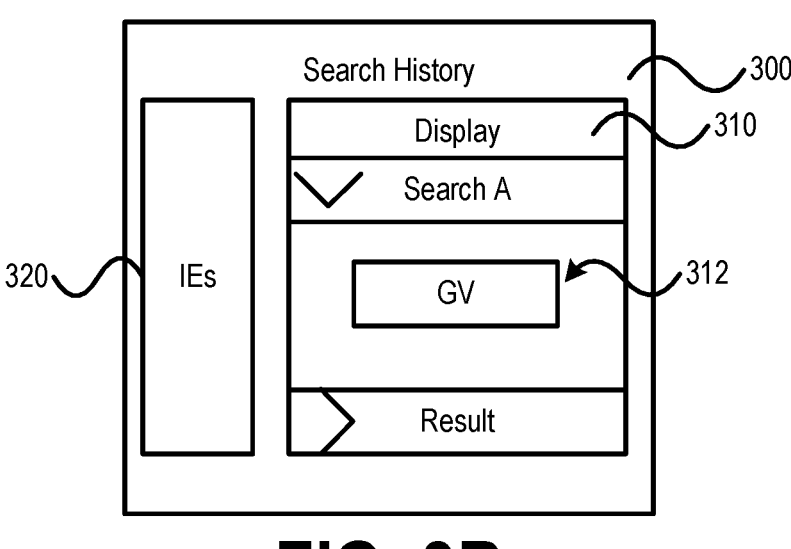

Referring FIGS. 3A-3B, additional block diagrams illustrating exemplary aspects of GUIs generated in accordance with aspects of the present disclosure are shown. In particular, the GUI of FIG. 3A shows an exemplary GUI 300 in which a search history may be displayed. The GUI 300 includes a display area 310 and interactive elements 320. The display area 310 may be configured to display information associated with past searches performed by a researcher. For example, the list of searches described above with reference to FIG. 2A may be displayed in the display area 310. The interactive elements 320 may provide functionality for modifying the searches displayed in the list of searches within the display area 310. For example, the interactive elements 320 may provide functionality to filter the displayed searches based on a period of time (e.g., the last week, month, or some other defined time period), based on a research identifier (e.g., information associated with an entity or focus of the research, such as a client identifier, a research project name, etc.), or other criteria. When one or more of the filters are configured the searches displayed in the list of searches within the display area 310 may be modified to display only those searches that satisfy the configured filters.

When a search from the list of searches is selected, a graphical view corresponding to the selected search may be shown. For example, FIG. 3B shows the GUI 300 displaying a list of searches within the display area 310. Each of the searches may include an interactive element, shown in FIG. 3B as a dropdown menu (e.g., > for closed menu and V for open menu). It is noted that while a dropdown menu is shown in FIG. 3B, other interactive element types may be utilized in accordance with the concepts described herein. When the interactive elements are activated, a graphical view of the research corresponding to the selected search may be presented, as shown at 312 by the box labeled "GV", which may be a graphical view of the state of the research similar to that shown in FIG. 2C. By displaying the graphical view in this manner a researcher can quickly assess the state of the research and quickly browse the reviewed search results (and related content) to determine which portions of the search results were most relevant. Once identified, the researcher can then pick up on the research where he/she left off or begin reviewing additional search results that had not yet been reviewed.

Figure 4A:
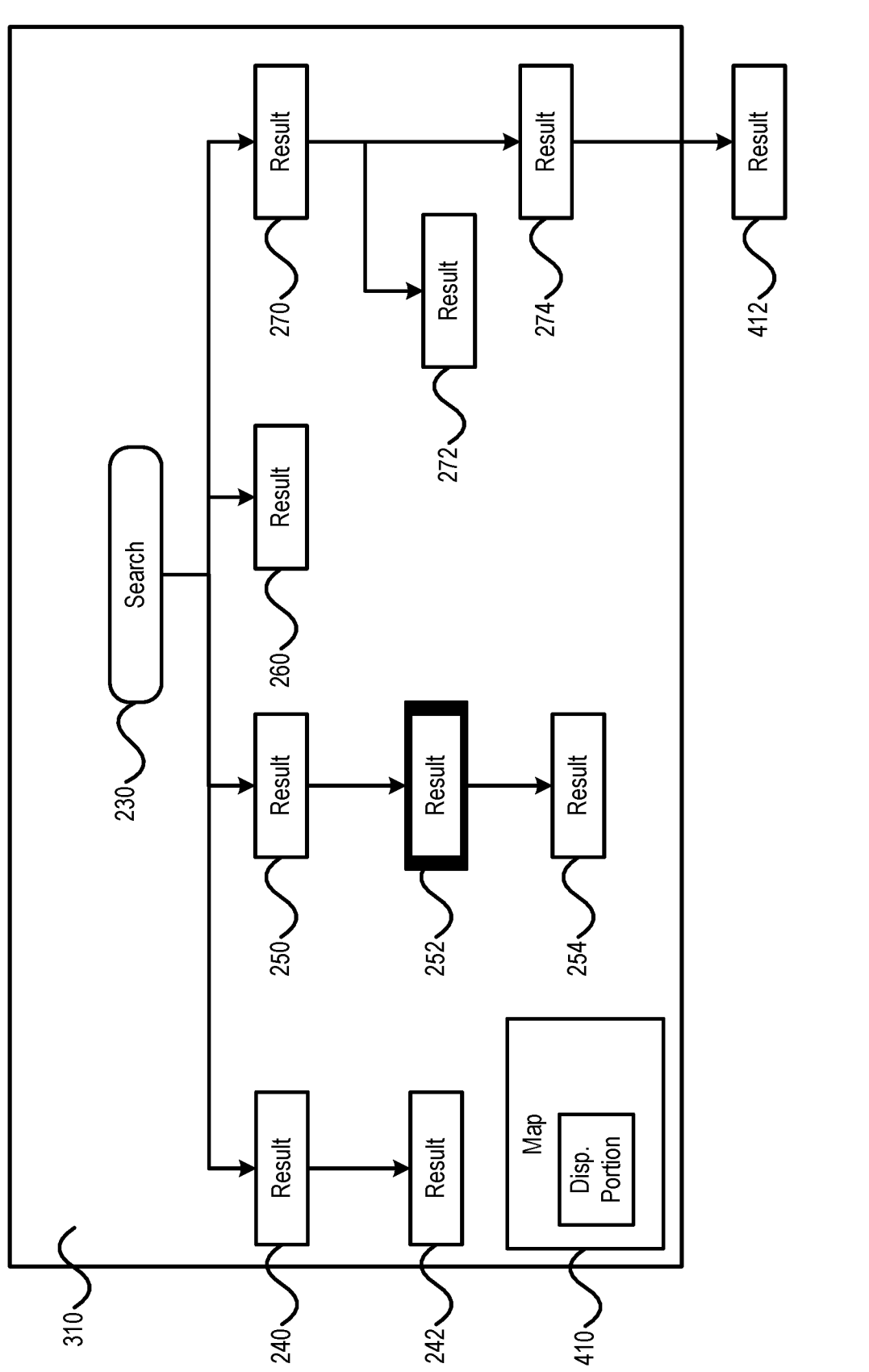
FIGS. 4A-4B are block diagrams illustrating aspects of graphical views of a search generated in accordance with aspects of the present disclosure.

Referring to FIG. 4A, a block diagram illustrating additional aspects of graphical views of a search generated in accordance with aspects of the present disclosure is shown. In particular, FIG. 4A shows the display area 310 of FIG. 3A populated with the graphical view of FIG. 2C. As can be seen in FIG. 4A, the graphical view may not entirely fit within the display area 310, with result 412 in the third layer of the graphical view being outside the viewing region of the display area 310. In an aspect, the display area 310 may include a map 410 that shows a miniature version of the graphical view in its entirety. The map may include a box (labeled "Disp. Portion" in FIG. 4A) that overlays the miniature version of the graphical view to enable the user to see whether any portions of the graphical view are not shown within the display area 310. The user may scroll or drag the graphical view (e.g., using a mouse or other input device, such as the I/O devices 124 of FIG. 1) to move the graphical view within the display area 310, thereby enabling the researcher to view the entire graphical view. For example, dragging the graphical view up may cause the results 412 to be visible within the display area 310. It is noted that other controls may also be provided, such as to zoom in or out on the graphical view, thereby increasing the amount of the graphical view that is displayed within the viewing region of the display area 310.

As briefly explained above, the graphical view may also be configured to convey information indicating a relevancy of different portions of the results associated with the anchor point of the graphical view. For example, in FIG. 4A result 252 is shown to include a colored border. This may signify the result 252 appears to be the most relevant result reviewed in the search so far, which may aid the researcher in quickly using the graphical view to identify relevant portions of the reviewed search results. This may enable the researcher to get back on track with reviewing search results more quickly as compared to simply viewing a list of search results and clicking through them one-by-one to remember what each search results covered and the relevancy of the search results to the overall research being performed, which may be especially challenging when viewing historical searches or when there is a period of time between the time the search results are first interacted with and when the researcher is using the graphical view. It is noted that while FIG. 4A is shown to utilize colored borders to indicate relevancy, other mechanisms may be utilized, such as to add numerical rankings to each search result displayed within the graphical view, thicknesses of the lines between elements of the graphical view, highlighting the connecting lines and result boxes, other techniques, or a combination thereof.

In an aspect, the relevancy of the elements of the graphical view may be quantified based at least in part on the metrics tracked by the tracking engine 120 of FIG. 1. For example, a duration of time spent reviewing a search result may be calculated and search results associated with a duration of time that exceeds a threshold amount of time may be determined to be more relevant to the research. As another example, the number of times that a researcher views a particular search result or content related to a search result (e.g., Key Cites, etc.) may be tracked and results associated with counts higher than a threshold count may be identified as relevant. The number of results incorporated into the graphical view that are derived from search results may also be used to identify results that are likely to be considered more relevant to the research. For example, if a researcher views multiple pieces of content referenced in a particular result (e.g., results 272, 274 of FIG. 2A), this may be an indication that the result referencing those additional pieces of content (e.g., result 270 if FIG. 2A) may be more relevant to the research. As yet another example, the tracked metrics may also include information associated with annotations made by the researcher for any of the results.

For example, the annotation metrics may indicate whether one or more annotations were created for a particular result, a number of annotations made (e.g., notes, highlights, etc.), a length of the annotations, and the like. In this example, it may be assumed that annotations indicate a higher degree of relevancy due to the researcher taking time to make notes or annotations about the result being viewed, with more annotations indicating a higher likelihood the result is relevant. It is noted that combinations of various tracked metrics described may be used to quantify the relevancy of search results. For example, metrics associated with the duration of time, as well as the count may be used to quantify relevancy of search results. Using a combination of tracked metrics may provide for improved accuracy with respect to quantification of the relevancy search results. In an aspect, relevancy scores may be generated for each tracked metric used to quantify relevancy of reviewed search results and an aggregate score may be determined based on the individual tracked metric scores, where the relevancy indications within the graphical view are based on the aggregate score, rather than any individual score. It is noted that in addition to using visual indicators within the graphical view to indicate results believed to be more relevant to the research, graphical views generated in accordance with aspects of the present disclosure may also use visual indicators to identify results that are likely to be less relevant to the research (e.g., a result that was viewed for a very short period of time may be determined to be less relevant compared to one viewed for a longer period of time). For example, a green border may be used to indicate relevant results and a red border may be used to indicate results less likely to be relevant.

Figure 4B:
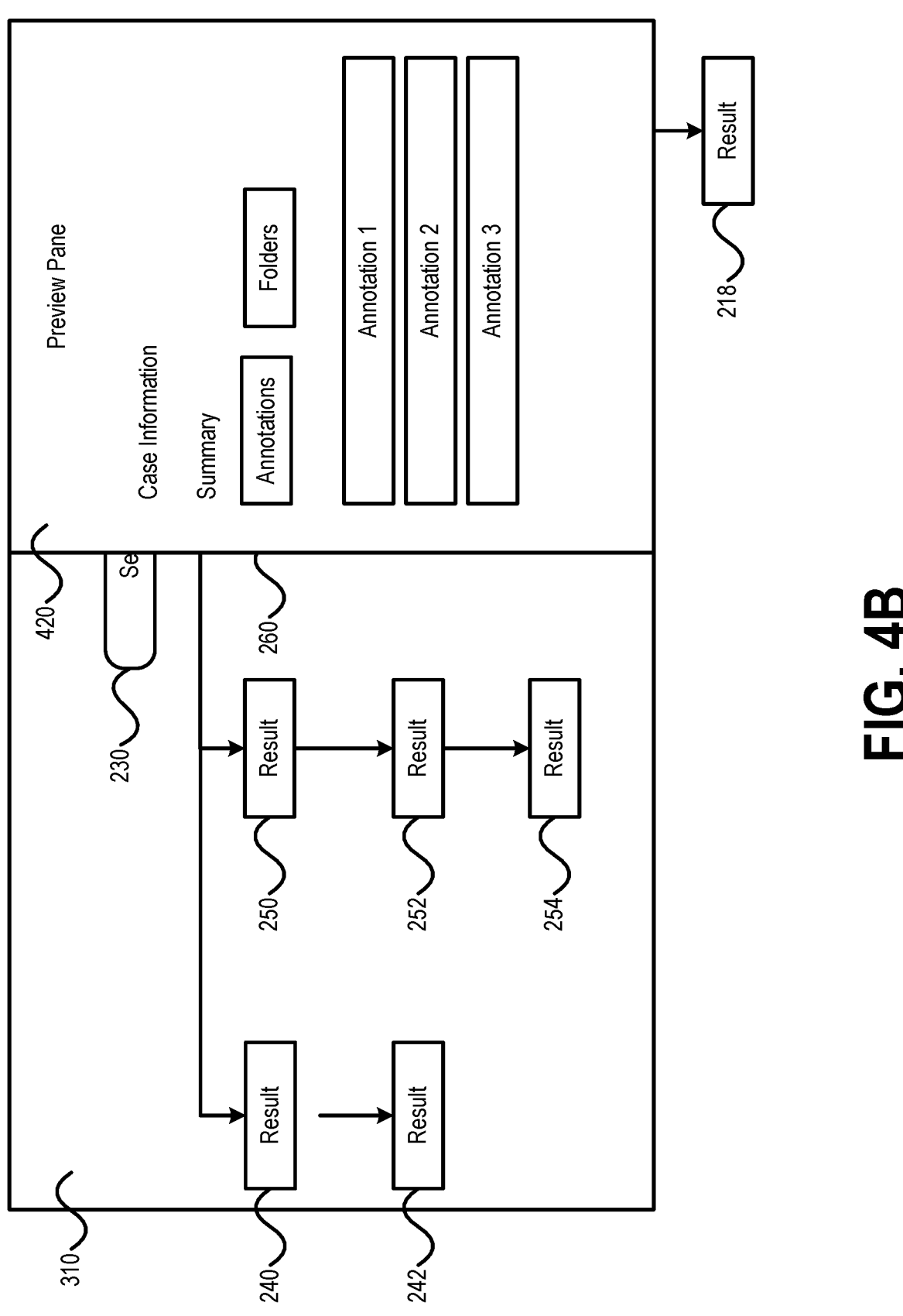

In an aspect, the researcher may be able to preview search results by selecting one or more elements within the graphical view shown in the display area 310. For example, FIG. 4B shows a block diagram of the display area 310 in which a preview pane 420 is displayed as an overlay. The preview pane 420 may be configured to display information associated with a selected result of the graphical view and may include information that indicates a case name (e.g., for results associated with legal cases), a summary of the selected result, annotations the researcher may have created, or other types of information. In an aspect, the preview pane 420 may support multiple tabs that the researcher can use to organize and view information, such as a folders tab, or other types of tabs. It is noted that within the preview pane 420 the user may be enabled to activate interactive elements that may cause display of additional information, which may be displayed in a different window to ensure the researcher does not lose his/her place within the graphical view.

As can be appreciated from the foregoing, the graphical views provided by the present disclosure provide greater insights into the state of research being conducted as compared to simply displaying a list of search results, as is currently done. Moreover, by tracking new types of information, such as the various types of metrics described herein, the graphical view is enabled to display visual indicators that quantify the relevancy of different results that have been reviewed during the research. Such capabilities may enable research to be performed more efficiently by focusing the attention of the researcher on results determined to be more relevant to the research, which may enable the researcher to get back on track more quickly when the researcher has stepped away from the research for a period of time or has been following a line of results within the search results that turned out to be less relevant.

Referring back to FIG. 1, the computing device 110 may be configured to output the graphical views described herein to a remote computing device, such as the computing device 130 via the one or more networks 150. For example, the computing device 130 may correspond to a computing device of a researcher and the search may be performed using a web browser communicating with a search service provided by the computing device 110.

In an aspect, the quantification of the relevancy of search results described above may be utilized by the computing device 110 to provide additional enhancements to the search service provided to the researcher. For example, the search parameters associated with a particular anchor point, the tracked metrics, and the search results and their respective quantified relevancies may be evaluated using a machine learning algorithm to identify features within the search parameters and the search results that are believed to contribute to higher and/or lower relevancy evaluations. Such information may then be provided to a search algorithm that may be configured to utilize learned relationships between search parameter features and the relevancy metrics to improve the search results returned in response to a subsequent search. In addition, the relevancy quantifications determined as described above may also be used to predict or recommend additional results to a researcher. For example, the tracked metrics may be used to identify groups of results that are frequently quantified as relevant when certain search parameter features are present. When one of the results within an identified group of results is viewed by a researcher, other results frequently identified as relevant may be recommended as additional content to the researcher. Using the above-described insights, the researcher may be provided with more results that are relevant to the features of the search parameters specified by the researcher, which may improve the overall quality of the research and enable the research to be concluded more quickly. As another example, the relationships between search parameter features and relevancy determinations for different results may be used to predict when a researcher is going down a dead end (e.g., viewing a line of results that is likely to be less relevant). For example, suppose the search parameter features of a given search query were associated with a set of results that are frequently identified as less relevant as compared to other results having a positive correlation to the search parameter features (e.g., more relevant). If the researcher is detected to be spending a significant amount of time viewing one or more of the results that fall into the less relevant group, the user may be provided with a prompt to indicate that he/she is viewing results believed to be less relevant and one or more of the results falling into the more relevant group with respect to the search parameter features may be suggested, thereby pointing the researcher in the direction of results that may be more likely to be what the researcher is looking for as compared to the less relevant results the researcher has been viewing. This may reduce the amount of time it takes to complete the research and enable the research to be completed with a high degree of accuracy in a more efficient manner.

Referring to FIG. 5, a flow diagram of an exemplary method for generating graphical views in accordance with aspects of the present disclosure is shown is shown as a method 500. In an aspect, the method 500 may be performed by a computing device, such as the computing device 110 of FIG. 1 or cloud-based logic 152 of FIG. 1. In an aspect, steps of the method 500 may be stored as instructions that, when executed by one or more processors (e.g., the one or more processors 112 of FIG. 1 or one or more processors of the cloud-based logic 152 of FIG. 1), cause the one or more processors to perform the steps of the method 500 to provide functionality for generating graphical views of searches in accordance with the concepts described herein.

At step 510, the method 500 includes identifying, by one or more processors, a set of search results based on one or more search parameters. As explained above, the search may be associated with performing legal research to identify legal documents (e.g., case law, statutes, journal articles, and the like) addressing a legal issue or topic of interest to the researcher. In an aspect, the search parameters may include key words, topics, jurisdiction requirements, or other search parameters suitable for performing legal research (e.g., Key Numbers, Key Cite information, headnote information, ect.).

The method 500 includes, at step 520, outputting, by the one or more processors, the set of search results to a GUI and, at step 530, receiving, by the one or more processors, inputs corresponding to activation of interactive elements of the GUI. As explained above, the GUI used to display the search results may include interactive elements corresponding to each search result. The interactive elements may be activated to cause the corresponding search result to be displayed. Additionally, the search results themselves may additionally include interactive element (e.g., links to additional content, such as case law documents, journal articles, statutes, Key Cites, and the like) that may be activated to display additional content that may or may not be included in the search results set (e.g., a case law document could be included in the set of search results but may also be referenced in another search result that includes an interactive element to view the case law document).

At step 540, the method 500 includes tracking, by one or more processors, one or more metrics associated with interactions corresponding to each search result displayed in response to the inputs. As explained above, the tracking engine 120 of FIG. 1 may be configured to track various metrics that may be used to track a researchers review of a set of search results. It is noted that these metrics may not currently be tracked by existing citation systems or used in the manner described herein (e.g., to create graphical views of searches and quantify relevancy of results with respect to search parameters). As noted above, the one or more tracked metrics may include a single metric or may include a plurality of metrics. A relevancy of each particular search result displayed in response to activation of the interactive elements may be determined based on a particular metric or a combination of the plurality of metrics, as described in more detail above. It is noted that the relevancy of each search result may be updated as changes in the observed metric values occur (e.g., for real time implementations or scenarios) or in response activation of a display graphical view command (e.g., for on demand implementations or scenarios).

At step 550, the method 500 includes generating, by the one or more processors, a graphical view of the interactions based on the one or more metrics. As noted above, the graphical view may be generated dynamically (e.g., as the user interactions occur) for real time implementations or may be generated in response to activation of an interactive element of the GUI in which the search results are displayed (e.g., activation of a display graphical view icon or button). The graphical view may be configured to present or display information associated with each particular search result displayed in response to the activation of the interactive elements (e.g., the search results that the researcher viewed). In an aspect, the graphical view may be generated to include information associated with a relevancy of each particular search result displayed in response to activation of the interactive elements, as explained above with reference to FIG. 4A. For example, the graphical view may be generated to include visual indications (e.g., colored borders, lines, highlighting, etc.) of the relevancy of at least one particular search result displayed in response to activation of the interactive elements.

At step 560, the method 500 includes outputting, by the one or more processors, the graphical view to a display device. As explained above with reference to FIG. 4B, once output, the GUI may be configured to display at least a portion of the information associated with a first search result in a preview pane in response to selection of a selectable element of the graphical view. In an aspect, the metrics may be updated in response to interactions with a search result via the preview pane.

In some aspects, the quantification of the relevance of each search result may be provided with other information described above to a machine learning algorithm configured to learn relationships between the parameters of the search, the search results, based on the quantified relevancies of the search results. Such relationships may then be utilized to configure search results returned in response to subsequent searches, prompt the researcher when the research appears to be focused on one or more search results that are predicted to be less relevant to the input search parameters, and/or recommend additional documents to the researcher (e.g., documents other researchers found relevant based on determinations that a particular search results appears relevant to the current researcher, etc.). Such additional insights provided based on the metrics described herein may facilitate enhanced searching of databases, especially databases containing legal content (e.g., case law, statutes, journal articles, etc.). Moreover, the graphical views disclosed herein provide a new mechanism or tool for evaluating the state of ongoing or old research and enable such research to be performed more efficiently, which may conserve computing resources of the citation system and reduce network bandwidth (e.g., due to less traffic related to performing searches and/or transmission of search results to the researcher over a network).

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-6 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method comprising:

identifying, by one or more processors, a set of search results based on one or more search parameters, wherein the set of search results correspond to legal content maintained at a data source;

outputting, by the one or more processors, the set of search results to a graphical user interface (GUI);

receiving, by the one or more processors, inputs corresponding to activation of interactive elements of the GUI, wherein information associated with a particular search result of the set of search results is displayed in response to the inputs, wherein the interactive elements comprises functionalities to filter the set of search results based on one or more research identifiers;

tracking, by one or more processors, one or more metrics associated with interactions corresponding to each search result displayed in response to the inputs, the one or more metrics including a time associated with each interaction;

generating, by the one or more processors, a graphical view of the interactions based on the one or more metrics, wherein the graphical view displays:

information associated with each particular search result displayed in response to the activation of the interactive elements, and visual indications quantifying, based on the one or more metrics, a relevancy of each particular search result; and outputting, by the one or more processors, the graphical view to a display device.

2. The method of claim 1, further comprising quantifying, based on the one or more metrics, the relevancy of each particular search result displayed in response to activation of the interactive elements.

3. The method of claim 1, further comprising displaying at least a portion of the information associated with a first search result in a preview pane in response to selection of a selectable element of the graphical view.

4. The method of claim 1, wherein the graphical view is output in response to activation of a first interactive element of the one or more interactive elements of the GUI.

5. The method of claim 1, wherein the graphical view is updated as each input is received.

6. The method of claim 1, wherein the one or more metrics comprise a plurality of metrics, and wherein the relevancy of each particular search result displayed in response to activation of the interactive elements is determined based on a combination of the plurality of metrics.

7. A system comprising:

a memory; and one or more processors communicatively coupled to the memory, the one or more processors configured to:

identify a set of search results based on one or more search parameters, wherein the set of search results correspond to legal content maintained at a data source;

output the set of search results to a graphical user interface (GUI);

receive inputs corresponding to activation of interactive elements of the GUI, wherein information associated with a particular search result of the set of search results is displayed in response to the inputs, wherein the interactive elements comprises functionalities to filter the set of search results based on one or more research identifiers;

track one or more metrics associated with interactions corresponding to each search result displayed in response to the inputs, the one or more metrics including a time associated with each interaction;

generate a graphical view of the interactions based on the one or more metrics, wherein the graphical view displays:

information associated with each particular search result displayed in response to the activation of the interactive elements, and visual indications quantifying, based on the one or more metrics, a relevancy of each particular search result; and output the graphical view to a display device.

8. The system of claim 7, further comprising quantifying, based on the one or more metrics, the relevancy of each particular search result displayed in response to activation of the interactive elements.

9. The system of claim 7, further comprising displaying at least a portion of the information associated with a first search result in a preview pane in response to selection of a selectable element of the graphical view.

10. The system of claim 7, wherein the graphical view is output in response to activation of a first interactive element of the one or more interactive elements of the GUI.

11. The system of claim 7, wherein the graphical view is updated as each input is received.

12. The system of claim 7, wherein the one or more metrics comprise a plurality of metrics, and wherein the relevancy of each particular search result displayed in response to activation of the interactive elements is determined based on a combination of the plurality of metrics.

13. A non-transitory computer-readable storage medium storing instructions that, when executed by one or more processors, cause the one or more processors to perform operations comprising:

identifying a set of search results based on one or more search parameters, wherein the set of search results correspond to legal content maintained at a data source;

outputting the set of search results to a graphical user interface (GUI);

receiving inputs corresponding to activation of interactive elements of the GUI, wherein information associated with a particular search result of the set of search results is displayed in response to the inputs, wherein the interactive elements comprises functionalities to filter the set of search results based on one or more research identifiers;

tracking one or more metrics associated with interactions corresponding to each search result displayed in response to the inputs, the one or more metrics including a time associated with each interaction;

generating a graphical view of the interactions based on the one or more metrics, wherein the graphical view displays:

information associated with each particular search result displayed in response to the activation of the interactive elements, and visual indications quantifying, based on the one or more metrics, a relevancy of each particular search result; and outputting the graphical view.

14. The non-transitory computer-readable storage medium of claim 13, the operations further comprising quantifying, based on the one or more metrics, the relevancy of each particular search result displayed in response to activation of the interactive elements.

15. The non-transitory computer-readable storage medium of claim 13, further comprising displaying at least a portion of the information associated with a first search result in a preview pane in response to selection of a selectable element of the graphical view.

16. The non-transitory computer-readable storage medium of claim 13, wherein the graphical view is output in response to activation of a first interactive element of the one or more interactive elements of the GUI.

17. The non-transitory computer-readable storage medium of claim 13, wherein the one or more metrics comprise a plurality of metrics, and wherein the relevancy of each particular search result displayed in response to activation of the interactive elements is determined based on a combination of the plurality of metrics.

18. The non-transitory computer-readable storage medium of claim 13, wherein the graphical view comprises a tree structure, wherein the search corresponds to a root of the tree structure, and wherein one or more branches of the tree structure identify each particular search result displayed in response to activation of the interactive elements.

* * * * *